United States Patent [19]

Maida et al.

[11] Patent Number: 5,153,632
[45] Date of Patent: Oct. 6, 1992

[54] FLASH EXPOSURE APPARATUS FOR AVOIDING RED-EYE EFFECT

[75] Inventors: Osamu Maida, Tokyo; Hidehiro Ogawa, Kawasaki, both of Japan

[73] Assignee: Nikon Corporation, Tokyo, Japan

[21] Appl. No.: 845,831

[22] Filed: Mar. 6, 1992

Related U.S. Application Data

[63] Continuation-in-part of Ser. No. 789,639, Nov. 12, 1991, abandoned, which is a continuation of Ser. No. 593,503, Oct. 4, 1990, abandoned, which is a continuation of Ser. No. 389,795, Aug. 4, 1989, abandoned.

[30] Foreign Application Priority Data

Aug. 12, 1988 [JP] Japan .................. 63-200079
Aug. 22, 1988 [JP] Japan .................. 63-208920

[51] Int. Cl.⁵ .......................................... G03B 15/05
[52] U.S. Cl. .................................. 354/415; 354/418; 354/132
[58] Field of Search .............. 354/132, 126, 145.1, 354/149.1, 415, 418

[56] References Cited

U.S. PATENT DOCUMENTS

4,051,494 9/1977 Fujita et al. .................. 354/149.11
4,285,588 8/1981 Mir ................................. 354/126
4,415,247 11/1983 Takematsu .................... 354/132

FOREIGN PATENT DOCUMENTS

58-9130 1/1983 Japan .
58-48088 10/1983 Japan .

OTHER PUBLICATIONS

Piper, Floyd G., "psa Journal," Jul. 1952, vol. 18, No. 7A, pp. 425, 426 & 444.

Primary Examiner—Russell E. Adams
Attorney, Agent, or Firm—Shapiro and Shapiro

[57] ABSTRACT

A flash exposure apparatus for eliminating red-eye effect employs first and second flash devices in conjunction with a camera. The camera outputs a first release signal prior to an exposure operation and a second release signal in synchronism with the exposure operation. A detecting device detects completion of preparation (charging) of flash light emission of the flash devices. When the completion of preparation of flash light emission of both flash devices is detected, the first and second flash devices are caused to emit light in response to the first and second release signals, respectively. When the completion of preparation of flash light emission of only one flash device is detected, only that flash device is caused to emit light in response to the second release signal. In another embodiment a main flash device emits light for illuminating an object, and an auxiliary flash device emits light, prior to emission by the main flash device, to decrease the pupil diameter of a human eye. A detecting device detects the focal length of a photo-taking lens, and the emission energy of the auxiliary flash device is increased as the detected focal length becomes longer.

13 Claims, 6 Drawing Sheets

FLASH EXPOSURE APPARATUS FOR AVOIDING RED-EYE EFFECT

This is a continuation-in-part of application Ser. No. 789,639 filed Nov. 12, 1991; which is a continuation of application Ser. No. 593,503 filed Oct. 4, 1990; which is a continuation of application Ser. No. 389,795 filed Aug. 4, 1989 (all of which are now abandoned).

BACKGROUND OF THE INVENTION

1. Field of the Invention

The present invention relates to a flash exposure apparatus, and more particularly, it relates to a flash exposure apparatus which can perform pre-emission to avoid a red-eye effect.

2. Related Background Art

Red-eye is an effect in which the pupil of a human eye has a reddish (or golden) color in a photograph obtained by the use of an electronic flash device. This red-eye effect occurs when flash light emitted by the electronic flash device is reflected by the retina of the eye and is imaged on a film. Since there are many capillary vessels in the retina and hemoglobin in the blood is red, the light reflected by the retina appears red.

It has been found experimentally that the red-eye effect is most prominent under two conditions: 1) when a flash photograph of a person is taken in a dark environment, and 2) when the distance between the emission portion of an electronic flash device and an optical axis of a photo-taking ("taking" lens) is short.

In condition 1) the diameter of the pupil of the eye may increase to 7-8 mm, increasing the amount of light incident on the eye and the amount of light reflected from the retina. With regard to condition 2), the retina of the eye has a high reflection factor and a high degree of orientation of reflected light.

Accordingly, when the emission portion of the electronic flash device is situated in the vicinity of the optical axis of the taking lens, and, thus, three elements (emission portion, taking lens and eye) are arranged in such a positional relation that the reflected light regularly reflected by the retina is introduced into the taking lens, a strong red-eye effect will occur. That is to say, when the angle formed between a line extending from the taking lens to the pupil of the eye (an object) and a line extending from the emission portion of the flash source to the pupil is smaller than a predetermined value, the red-eye effect occurs without fail. Experimentally, it was found that such predetermined value of the angle is about 2 to 2.5 degrees. Accordingly, it is possible to avoid the red-eye effect by keeping the emission portion of the electronic flash device away from the optical axis of the taking lens. However, there is a practical limit to distance between the emission portion and the optical axis of the taking lens. Even when the emission portion is separated from the optical axis of the taking lens by the distance limit, if the distance between the taking lens and the object (referred to as "object distance" hereinafter) is lengthened, the above-mentioned angle tends to be lower than the above-mentioned predetermined value. In other words, when the object distance has a predetermined value or more, it will be difficult to avoid the red-eye effect.

For these reasons, various techniques for avoiding the red-eye effect have been proposed. For example, a magazine "psa JOURNAL" (July, 1952) discloses a method in which human eyes are exposed to bright light to decrease the diameter of the pupil of the eye to 3 mm or less, and then the object (including such eyes) is photo-taken by energizing the flash device, thus avoiding the red-eye effect. Further, the Japanese Patent Publication No. 58-48088 discloses a technique in which, before taking a photograph, a pre-emission by means of a preliminary emission lamp is executed for a time required for closing the pupil, and when the pupil substantially reaches its minimum diameter the emission portion of the electronic flash device is energized to take a photograph. In addition, the Japanese Laid-Open Patent Application No. 58-9130 discloses a technique in which two flash discharge tubes are provided, and, after the pre-emission is executed by one of the flash discharge tubes to close the pupil of the eye, main-emission is executed by the other flash discharge tube to take a photograph.

Figure 8:
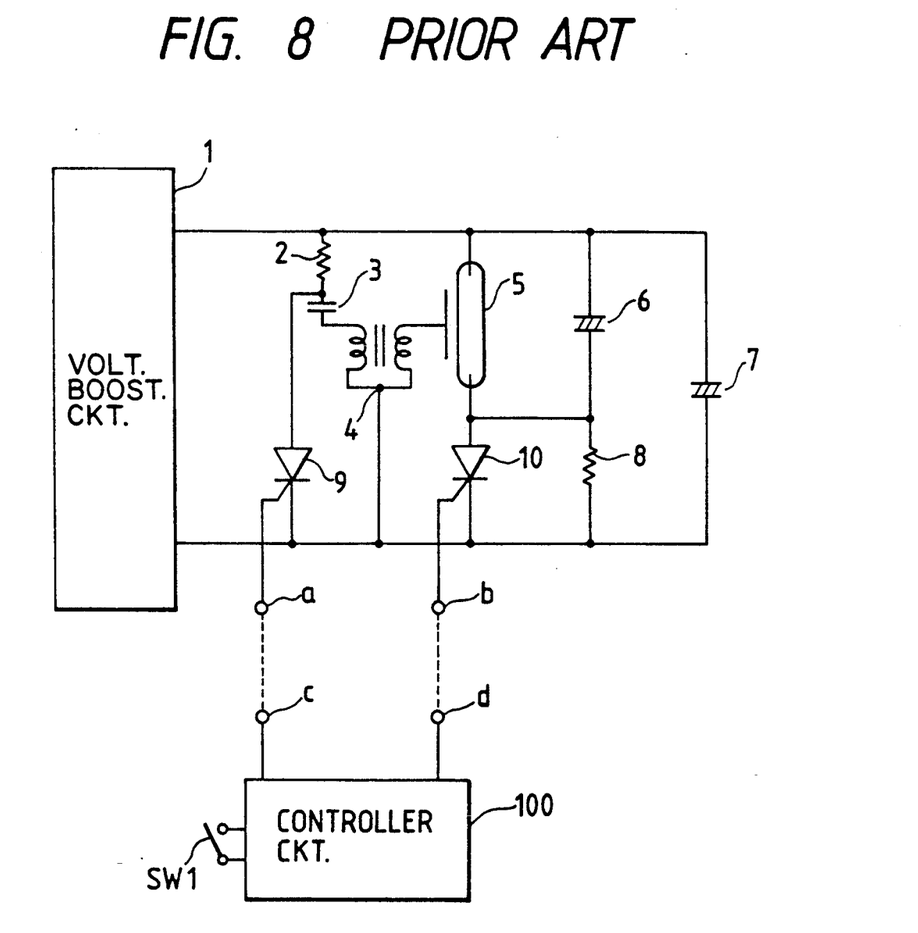
FIG. 8 is a block and circuit diagram of a conventional flash exposure apparatus for avoiding red-eye effect.

FIG. 8 shows an example of a conventional flash exposure apparatus for avoiding the red-eye effect. In operation, capacitors band 7 are charged at about 300 volts by a voltage booster circuit 1. In accordance with a release signal from a camera (not shown), a thyristor 9 is firstly turned ON, whereby high voltage is applied to a trigger electrode of a Xe tube 5, and the Xe tube 5 is illuminated by the energy accumulated in the capacitor 6. Then, when a shutter is opened, a switch SW1 is turned ON. In response to this, the thyristors 9 and 10 are simultaneously turned ON through terminals a-c and b-d, whereby the Xe tube 5 is illuminated by the energy accumulated in the capacitor 7.

A control circuit 100 shown in FIG. 8 functions to generate strobe emission (electronic flash emission) twice. In the first strobe emission, the irises of the eyes of the person to be photographed (object) are closed or restricted before taking a photograph, and, after the irises are closed, the second strobe emission is performed, thereby to avoid the red-eye effect.

However, with the construction of the flash exposure apparatus shown in FIG. 8, two charging capacitors must be provided in a camera body which should be compact and light. Thus, naturally, the capacity or ability of the capacitor for the flash device cannot be large, thereby reducing maximum amount of light which can be used in each exposure (i.e., decreasing the guide number). As a result of the reduction of the guide number, a problem arises in that freedom of exposure using the flash device, for example, the range of selection of lenses having different focal length, is restricted.

In the above-mentioned conventional flash exposure apparatus, the pre-emission having constant intensity of light is generated for a given time. Accordingly, even if the amount of light is quite enough to avoid the red-eye effect when the object (person) is positioned near the camera, when the object is positioned far from the camera (in which case the red-eye effect is apt to occur), the amount of light will be insufficient, with the result that the red-eye effect cannot be fully avoided.

SUMMARY OF THE INVENTION

An object of the present invention is to provide a flash exposure apparatus which docs not restrict the freedom of exposure when using the flash device and can effectively avoid the red-eye effect.

Another object of the present invention is to provide a flash exposure apparatus which can avoid the red-eye effect without decreasing the guide number.

A further object of the present invention is to provide a flash exposure apparatus which can be used with a camera on which an outer or external flash device having a discrete power source for emission can be removably mounted.

In one embodiment of the invention flash exposure apparatus comprises an output portion for outputting a first release signal emitted prior to a shutter operation during an exposure operation, and a second release signal emitted in response to the shutter operation; an incorporated (built-in) flash device; a power source for energizing or illuminating the incorporated flash device; and a control means for firstly illuminating the incorporated flash device (or the above-mentioned outer flash device) in response to the first release signal and then illuminating the outer flash device (or the incorporated flash device) in response to the second release signal when the outer flash device is connected to the flash exposure apparatus, and for illuminating the incorporated flash device in response to the second release signal when the outer flash device is not connected to the flash exposure apparatus.

Another object of the present invention is to provide a flash exposure apparatus which can positively avoid the red-eye effect, irrespective of object distance.

A further object of the present invention is to provide a flash exposure apparatus in which the amount of light will not be insufficient even if the object distance is long, and which can positively avoid the red-eye effect.

Another object of the present invention is to provide a flash exposure apparatus comprising a main flash means for emitting first illumination light to illuminate an object, an auxiliary flash means for emitting second illumination light toward the object prior to the emission of the first illumination light, a means for detecting a focal length of a taking lens, and a control means for controlling the amount of the second illumination light so that the longer the detected focal length, the more the amount of the second illumination light is increased.

DETAILED DESCRIPTION OF THE PREFERRED EMBODIMENTS

The present invention will now be explained with reference to the accompanying drawings.

First of all, a first embodiment of the present invention will be explained in connection with FIGS. 1 to 3.

Figure 1:
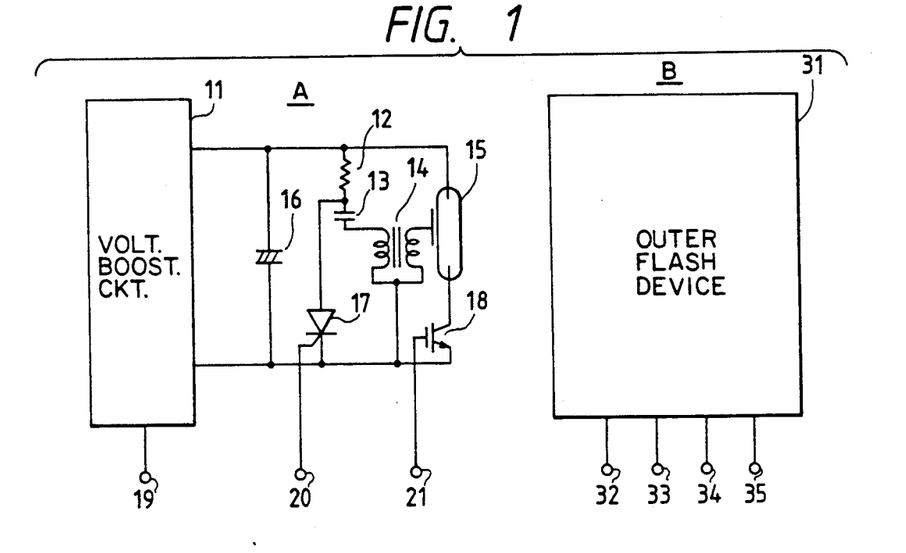
FIG. 1 is a block and circuit diagram showing a a flash exposure apparatus according to a first embodiment of the present invention.

FIG. 1 shows an incorporated flash device, a control circuit therefor, and an outer or external flash device. In FIG. 1, a portion A includes the incorporated flash device and the control circuit therefor. This portion A is incorporated into a camera which can emit a first release signal prior to opening of shutter blades and can emit a second release signal in synchronism with the opening operation of the shutter blades. A portion B in FIG. 1 includes the outer flash device 31 which is provided with a GND terminal 32, an output terminal 33 for outputting a charging completion signal, an input terminal 34 for receiving an emission start signal, and an input terminal for receiving an emission stop signal. The outer flash device 31 further includes an incorporated power source (not shown) for illuminating the flash device.

Figure 2:
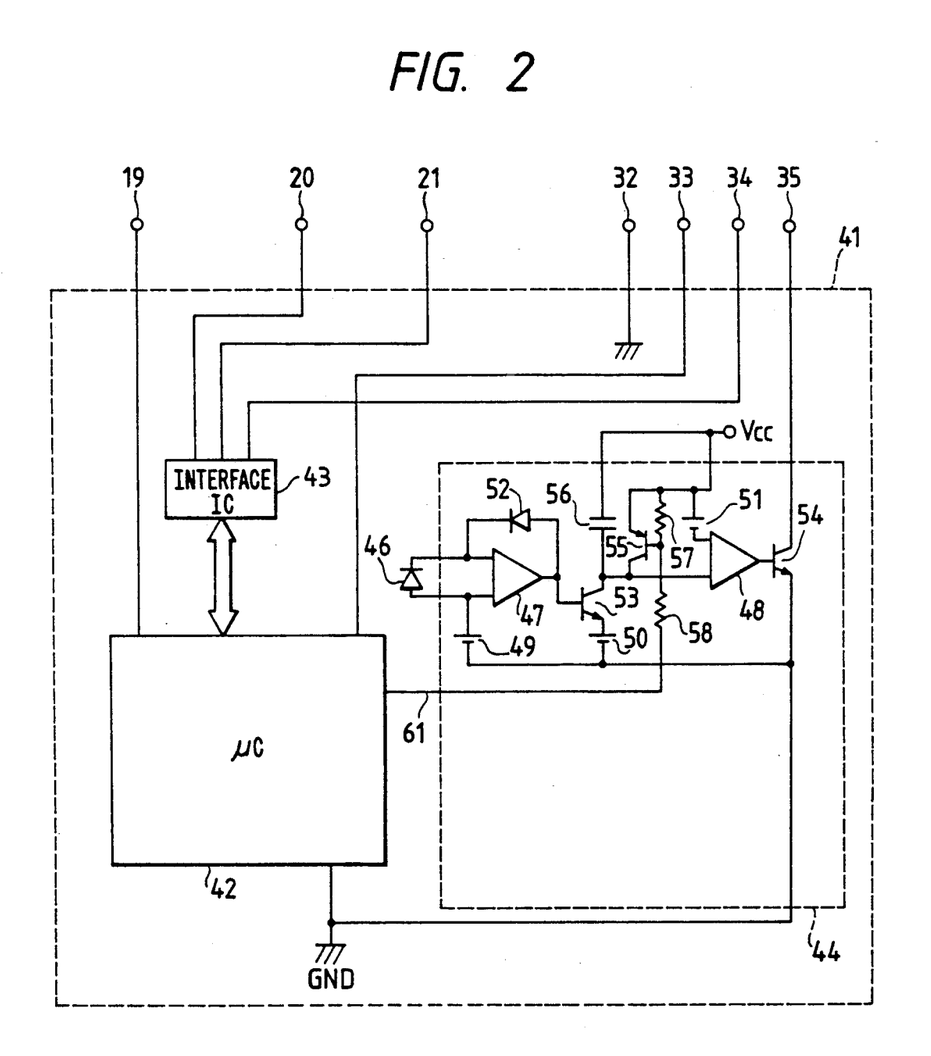
FIG. 2A is a circuit diagram of an operation circuit for the flash apparatus of FIG. 1.
FIG. 2B is a flow chart showing a sequence of flash exposure.
FIG. 2C is a timing chart of the operation of the flash exposure apparatus according to the first embodiment of the present invention.

FIG. 2A shows an operation circuit for transmitting operation signals to the portions A and B of FIG. 1. This operation circuit is provided in the above-mentioned camera (designated by dash-line 41 in FIG. 2). Terminals of the operation circuit of FIG. 2A correspond to the terminals of the portions A and B of FIG. 1, and these corresponding terminals are connected to each other by appropriate wiring (not shown), respectively.

In FIG. 2A, the camera 41 includes therein a microcomputer 42 for controlling the camera, an interface IC (integrated circuit) 43, and a photometric IC 44. The microcomputer 42, constituting control means, includes output portions for outputting the aforementioned first and second release signals, which output portions emit the first and second release signals when a release button (not shown) is depressed. The interface IC 43 receives a command from the microcomputer 42 and acts as an electric interface for the portions A and B.

The photometric IC 44, to which a photometric photo-diode 46 is connected, includes a conventional adjuster circuit (light output control circuit) for the flash device. The adjuster circuit comprises an OP amplifier 47, comparator 48, reference voltage sources 49, 50, 51, logarithmic compression diode 52, transistors 53, 54, 55, integration capacitor 56, and resistors 57, 58.

Next, the manner in which the above-mentioned adjuster circuit for the flash device normally controls the outer flash apparatus will be explained with reference to FIG. 2A.

It is assumed that an emission control changing-over switch (this switch can be switched over between an emission position for avoiding the red-eye effect and a normal emission position) is positioned in the normal emission position. When the outer flash device is energized, before exposure the transistor 55 is turned ON and charge is not accumulated in the capacitor 56. Now, when the exposure is effected, the shutter blades of the camera are opened, and at the same time the emission start signal outputted from the microcomputer 42 is transmitted to the outer flash device 31 (portion B in FIG. 1) through the emission start signal input terminal 34, thus illuminating the outer flash device. Further, the transistor 55 is turned OFF by a signal transmitted thereto from the microcomputer 42 through a signal line 61. Thereafter, light reflected by an object is a film and is introduced into the photometric diode 46. The light incident on the photometric diode 46 is subject to current-voltage conversion by means of the OP amplifier 47 and the logarithmic compression diode 52, and, by the output (voltage) thereof, the transistor 53 is turned ON and the capacitor 56 is charged. The voltage is compared with the reference voltage of the reference voltage source 51 by means of the comparator 48. When the voltage exceeds the predetermined reference voltage, the output is reversed to turn the transistor 54 ON. A signal generated from the transistor 54 is transmitted to the outer flash device through the emission stop signal input terminal 35, stopping light emission or illumination of the outer flash device. The above-mentioned control manner is conventional.

Next, a manner for controlling the emission to avoid the red-eye effect in the flash exposure apparatus according to the first embodiment of the present invention will be explained with reference to FIGS. 1, 2A, and 2B.

When the above-mentioned emission control changing-over switch is positioned in the emission position for avoiding the red-eye effect, high DC voltage generated from a voltage increasing circuit, i.e., booster circuit 11 of the portion A of FIG. 1 charges a capacitor 16. A capacitor 13 is also charged through a resistor 12 and primary windings of a trigger transformer 14. After charging, a signal on a charge completion signal terminal 19 is changed from Hi level to Lo level, thus indicating the completion of preparation of emission of the incorporated flash device (step S50 in FIG. 2B).

Further, a start switch (not shown) for the outer flash device 31 is also turned ON. When the charging of outer flash device 31 is completed, a signal on the charging completion signal output terminal 33 is changed from Hi level to Lo level, thus indicating the completion of preparation of emission of the outer flash device 31 (step S51 in FIG. 2B).

In this condition, the release button of the camera is depressed to emit the first release signal (step S52 in FIG. 2B). The first release signal triggers a thyristor 17 through an emission trigger terminal 20. When the thyristor 17 is triggered, high voltage is generated on a secondary side of the trigger transformer 14 which voltage is applied to a trigger electrode of a Xe tube 15. Further, when a large current control element 18 is turned ON through the medium of a control terminal 21, the Xe tube 15 is illuminated by the charge accumulated in the capacitor 16. Such illumination or emission of the Xe tube 15 is effected to avoid the red-eye effect.

Thereafter, when the large current control element 18 is turned OFF through the medium of the control terminal 21, the emission of the Xe tube is stopped. The control terminal 21 is controlled by a timer incorporated into the microcomputer 42 to control the ON-/OFF condition of the large current control element 18 and accordingly the emission time of the Xe tube 15 (step S53 in FIG. 2B). Incidentally, when the charging completion signal on the terminal 19 is in the Hi level condition (condition that the charging has not yet been completed), the Xe tube 15 is not illuminated (steps S56 and S57 in FIG. 2B).

Further, when the second release signal is emitted after the release button of the camera is depressed, the second release signal is transmitted to the outer flash device 31 through the emission start signal input terminal 34, thus illuminating the outer flash device (step S54 in FIG. 2B). When the adjuster circuit, i.e., light output control circuit of FIG. 2A is operated and the emission stop signal is transmitted to the outer flash device 31 through the emission stop signal input terminal 35, the emission of the outer flash device is stopped (step S55 in FIG. 2B). Incidentally, when the charging completion signal on the terminal 33 is in the Hi level condition (condition that the charging has not yet been completed), the outer flash device 31 is not illuminated (step S58 in FIG. 2B).

Thus, the outer flash device is prohibited from emitting light. However, the release button is being continuously depressed, so a first release signal is outputted (step S59 in FIG. 2B). In response to this first release signal, the incorporated flash device is controlled to emit light, thereby the red eye effect being prevented (step S60 in FIG. 2B), in the same manner as described hereinbefore.

Thereafter, a second release signal is outputted at the terminal 20 (step S61 in FIG. 2B), and the incorporated flash device is controlled to generate flash light so that flash light photography is effected (step S62 in FIG. 2B).

Either an exposure using the flash device for avoiding the red-eye effect or a normal flash exposure may be selected by means of the emission control changing-over switch (not shown). When an exposure for avoiding the red-eye effect is not desired, the outer flash device may be used or the incorporated flash device may be used in the same manner, thus performing a normal flash exposure.

FIG. 2C shows a timing chart for the flash exposure apparatus. The reference numerals (for example, S19, S33) show the signals generated at the terminals of FIGS. 1 and 2A, and each signal is generated at the corresponding terminal shown by the numeral (for example, the signals S19 and S33 are generated at the terminals 19 and 33, respectively). Each signal can be either in the Hi level condition or Lo level condition. Incidentally, in FIG. 2C, the abscissa indicates "time". With reference to FIG. 2C, an operation of the flash exposure apparatus according to the first embodiment of the present invention will be explained.

At a time $t_1$, by completing the charging of the incorporated flash device, the charging completion signal S19 is changed from Hi level to Lo level. And, at a time $t_2$, by completing the charging of the outer flash device, the charging completion signal S33 is changed from Hi level to Lo level. At this time, preparation of the two flash devices for illumination will have been completed.

In this condition, when the release operation of the camera is performed and the first release signal is emitted, the signals on the emission trigger terminal 20 and the control terminal 21 are changed from Lo level to Hi level (at the time $t_3$), thus illuminating the incorporated flash device. As mentioned above, the duration of emission of the incorporated flash device is controlled by the timer in the microcomputer. At a time $t_4$, by changing the signals on the emission trigger terminal 20 and the control terminal 21 to the Lo level again, the emission of the incorporated flash device is stopped.

Then, the release button of the camera is further depressed, the shutter blades are opened and at the same time the second release signal is emitted. The second release signal is converted to the emission start signal S34. The emission start signal S34 is changed from the Hi level condition to the Lo level condition and is transmitted to the emission start signal input terminal 34 of the outer flash device 31 (at a time $t_5$), thus illuminating the outer flash device 31. Thereafter, the emission stop signal from the above-mentioned automatic emission control apparatus including the light output control circuit shown in FIG. 2A is changed from the Hi level condition to the Lo level condition and is transmitted to the emission stop signal input terminal 35 (at a time $t_6$), thus stopping the emission of the outer flash device. At a time $t_7$, the emission start signal S34 and the emission stop signal S35 are changed to the Hi level again.

While the foregoing description of the present invention explains to the flash exposure apparatus according to the first embodiment, it should be noted that the present invention is not limited to this embodiment, and various alterations and/or modifications can be adopted without departure from the sprit of the present invention. For example, the outer flash device may be used for avoiding the red-eye effect and the incorporated flash device may be used for performing the normal flash exposure. Further, when the outer flash device is attached to the flash control apparatus of a camera designed so that the emission for avoiding the red-eye effect and the emission for the normal exposure are effected by an incorporated flash device, the incorporated flash device may be used for avoiding the red-eye effect and the outer flash device may be used for the normal flash exposure.

Figure 3:
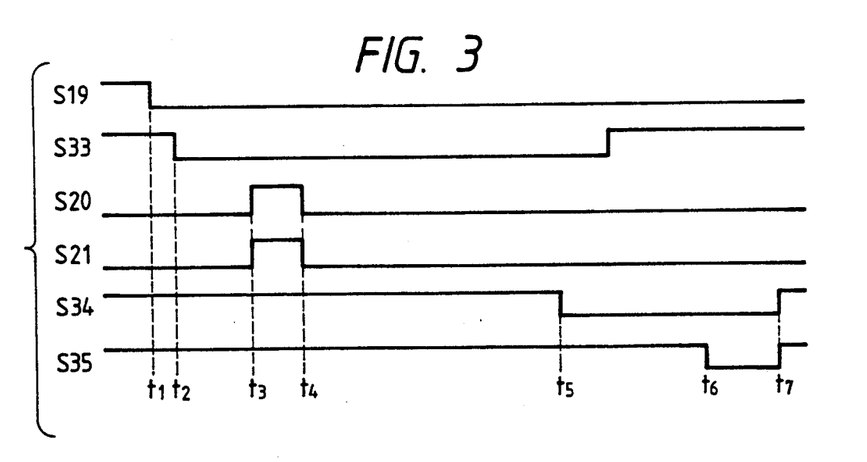
FIG. 3 is a flow chart illustrating the operation of a modification.

Such a camera is explained concretely with reference to FIG. 2A and FIG. 3.

FIG. 3 is a flow chart of the microcomputer 42 in FIG. 2A.

At step S100, a detection is made at the terminal 33 of the microcomputer 42 as to whether the outer flash device (portion B) has been attached to or mounted on the camera equipped with the incorporated flash device (portion A). If the outer flash device has been attached to the camera, the charging completion signal can be detected at the terminal 33, and the microcomputer 42 judges that the outer flash device has been attached to the camera if such detection is made.

If the step S100 is negative, the flow advances to step S101, where in accordance with the shutter release operation of the camera, a first release signal is outputted at the terminal 20, thereby the incorporated flash device being controlled to generate flash light (step S102) in the same manner as described and the red eye effect being prevented.

Then, at step S103, a second release signal is outputted at the terminal 20, and at step S104 the incorporated flash device is controlled to generate flash light in the same manner as described, thereby a flash photography being effected.

In a case where, at step S100, it is detected that the outer flash device is attached to the camera, the flow advances to step S105 where, in response to the operation of the release button of the camera, a first release signal is outputted at the terminal 20. Thus, at step S106, the incorporated flash device is controlled to generate flash light in the same manner as described and the red eye effect is prevented.

Then, at step S107, a second release signal is outputted at the terminal 20, and at step S108 the outer flash device is controlled to produce flash light so that a flash photography is effected.

As mentioned, according to the flash exposure apparatus of the first embodiment of the present invention, the guide number in the normal flash exposure is not decreased by the pre-emission for avoiding the red-eye effect.

Further, the flash device which is used for performing the flash exposure can be freely selected (from the incorporated flash device or the outer flash device), whereby it is possible to perform an exposure requiring a large amount of light (i.e., large emission energy), by using different flash devices having different light distribution features, or using different lenses having different focal lengths.

Figure 4:
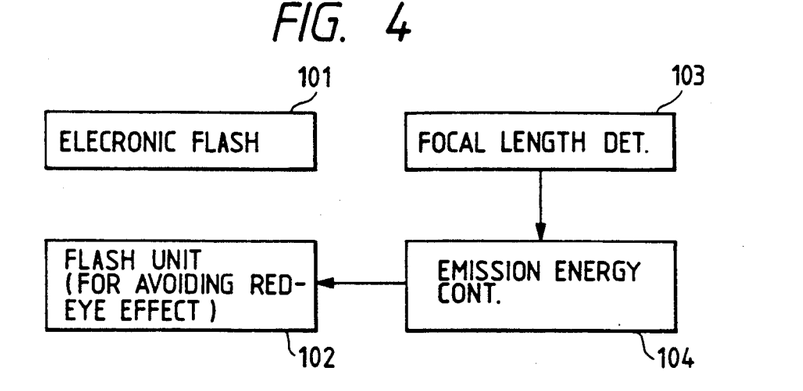
FIG. 4 is a conceptual block diagram of a flash exposure apparatus according to a second embodiment of the present invention.

Next, the concept or principle of a flash exposure apparatus according to a second embodiment of the present invention will be explained with reference to FIG. 4. The flash exposure apparatus according to this second embodiment comprises a main flash device or electronic flash device 101 for emitting light for illuminating an object, and an auxiliary flash device 102 for emitting light for avoiding the red-eye effect, and is designed so that the auxiliary flash device 102 is illuminated prior to illumination of the main flash device 101. A problem mentioned earlier can be solved by the provision of a focal length detection device 103 for detecting a focal length of a taking lens, and an emission energy control device 104 for controlling an amount of emitted light (emission energy) so that the emission energy of the light for avoiding the red-eye effect is increased as the detected focal length is increased.

Now, the flash exposure apparatus according to the second embodiment of the present invention will be more specifically explained with reference to FIGS. 5 to 7.

Figure 5:
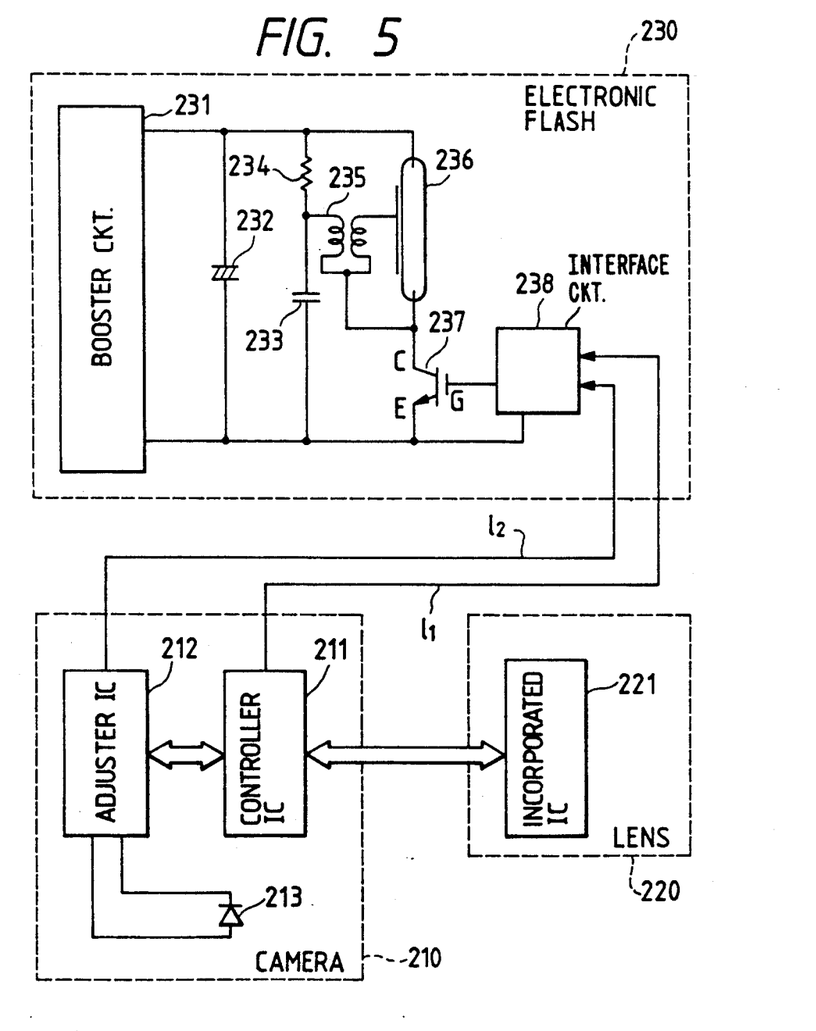
FIG. 5 is a block and circuit diagram of the flash exposure apparatus according to the second embodiment of the present invention.

FIG. 5 is a block and circuit diagram showing the whole construction of the flash exposure apparatus for avoiding the red-eye effect. An adjuster IC (i.e., light output control IC) 212 is connected to a control IC 211 provided in a camera 210, and a light receiving element 213 is connected to the adjuster IC 212. The light receiving element 213 detects luminance or brightness of the object when an electronic flash device (which will be described later) is illuminated, and sends its detection signal to the adjuster IC 212. When an integration value of the detection signal exceeds a predetermined level which is determined on the basis of information regarding sensitivity of a film outputted from the control IC 211, the adjuster IC 212 outputs a main emission stop signal having Lo level to stop the emission of the flash device.

Further, an incorporated IC 221 provided in a taking lens 220 is connected to the control IC 211. In the incorporated IC 221, lens information regarding the focal length of the taking lens, aperture F-value corresponding to the focal length and the like is previously stored. This lens information is inputted to the control IC 211. The control IC 211 judges or discriminates whether the emission of the electronic flash device 230 is required in the exposure, on the basis of such lens information, information regarding the brightness of the object from an exposure control photometric IC (not shown) and information regarding the above-mentioned sensitivity of the film. When it is judged that the electronic flash device should be illuminated, the control IC emits a pre-emission start signal for performing the pre-emission (described later) and then emits a main emission start signal for generating main emission for illuminating the object, in response to the shutter release operation.

The electronic flash device 230 has a booster circuit 231, a main capacitor 232 and a trigger capacitor 233.

By increasing the voltage by means of the booster circuit 231, the main capacitor 232 and the trigger capacitor 233 are charged. Further, the electronic flash device 230 includes a resistor 234, a trigger transformer 235, a Xe (xenon) tube 236, a large current control element 237 and an interface circuit 238. The above-mentioned main emission start signal from the control IC 211 and main emission stop signal from the adjuster IC 212 are sent to the interface circuit 238. When the main emission start signal is inputted, the voltage is applied to a gate G of the large current control element 237 through the interface circuit 238, thus electrically connecting a collector C to an emitter E of the control element 237. Consequently, the energy accumulated in the trigger capacitor 233 is applied to a trigger electrode of the Xe tube 236 through the trigger transformer 235. As a result, the Xe tube 236 is illuminated by the energy accumulated in the main capacitor 232. Further, when the main emission stop signal from the adjuster IC 212 is inputted to the interface circuit 238 during the emission of the Xe tube, the interface circuit 238 stops the application of the voltage to the gate G of the large current control element 237, whereby the collector C of the control element is disconnected from the emitter E, thus stopping the illumination of the Xe tube 236.

Figure 6A:
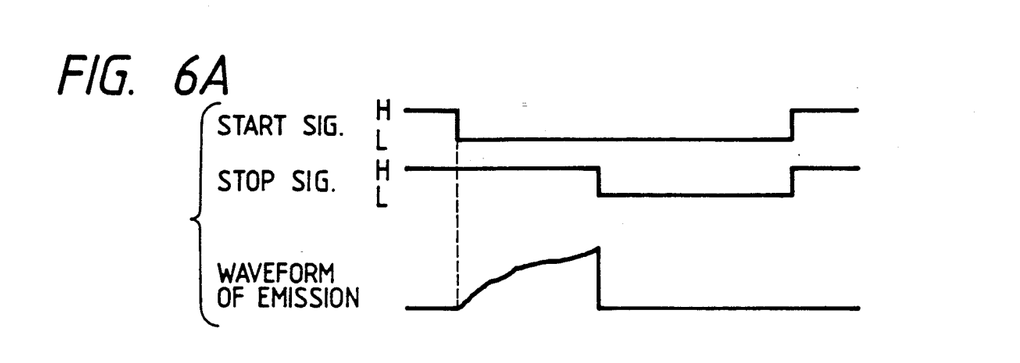
FIG. 6A is a timing chart showing signals at main emission and a waveform of emission.
Figure 6B:
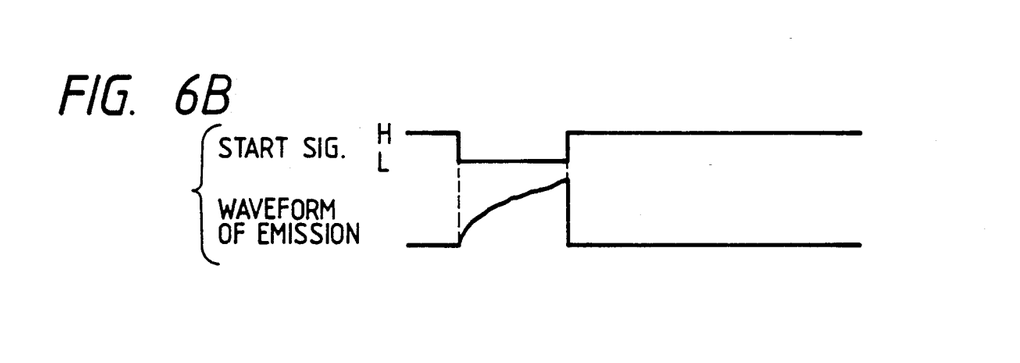
FIG. 6B is a timing chart showing signals at pre-emission and a waveform of emission.
Figure 6C:
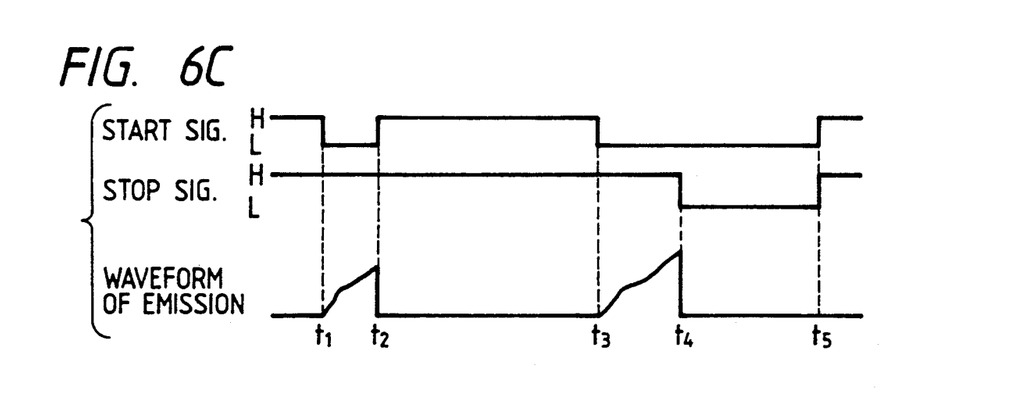
FIG. 6C is a timing chart showing a condition when the pre-emission and the main emission are performed.
Figure 7:
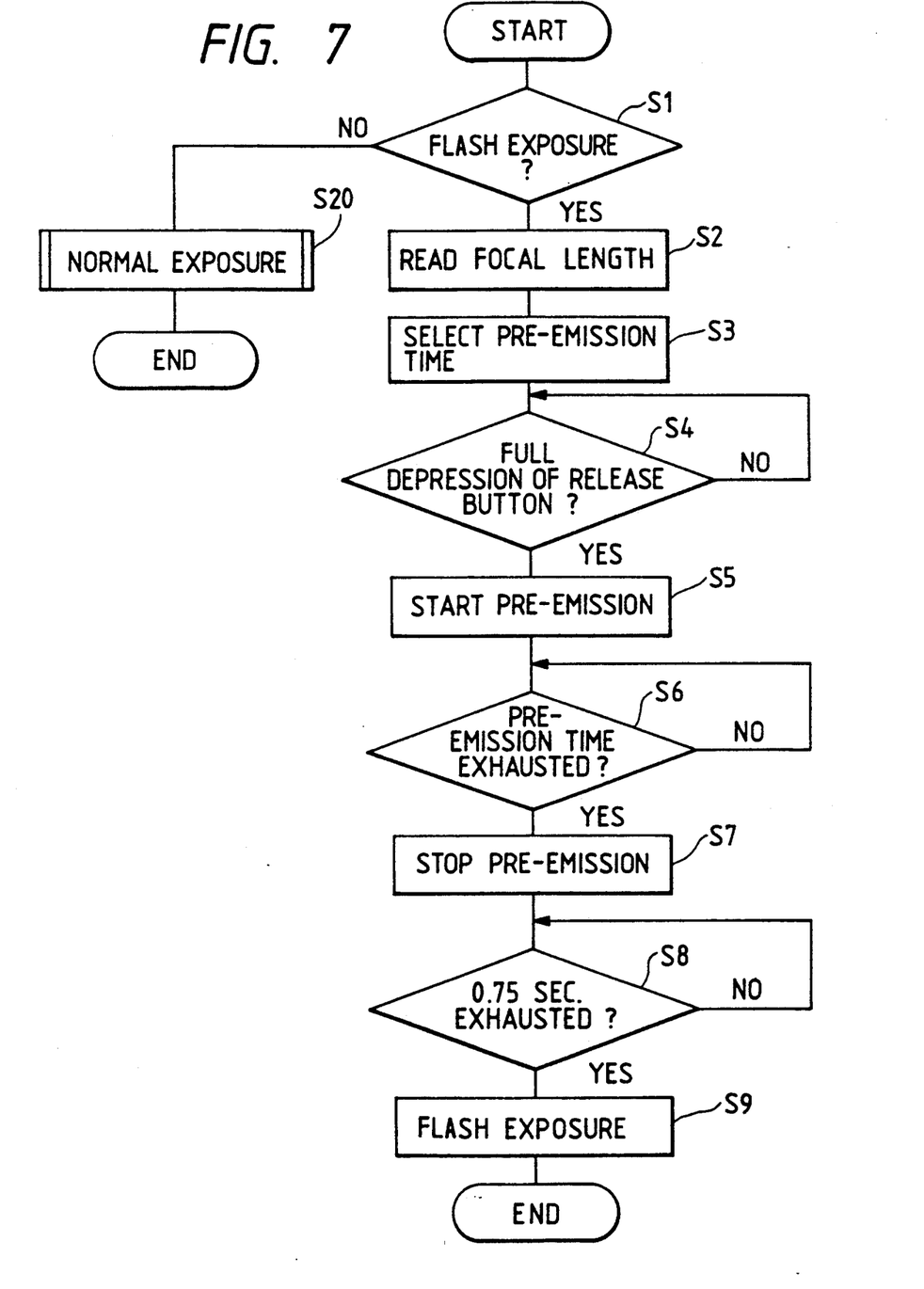
FIG. 7 is a flow chart showing a sequence of flash exposure.

FIG. 6A shows waveforms of each signal and the main emission varied with time.

When the start signal on a signal line $l_1$ (FIG. 5) is changed to Lo level, i.e., when the main emission start signal is outputted, the pre-emission is started, thus increasing the amount of light emission (emission energy) as time goes on; whereas, when the stop signal on a signal line $l_2$ is changed to Lo level, i.e., when the main emission stop signal is outputted, the pre-emission is stopped, thus making the emission energy zero.

Further, in the second embodiment, the electronic flash device 230 is also used as a flash device for avoiding the red-eye effect. During the flash exposure, the control IC 211 emits the pre-emission start signal to perform the pre-emission for avoiding the red-eye effect prior to the above-mentioned main emission. The pre-emission serves to decrease the pupil diameter of the human eye. As shown in FIG. 6B, by the output of the pre-emission start signal, the Xe tube 236 is illuminated in the same manner as mentioned above; and when the pre-emission start signal is stopped, the illumination of the Xe tube is stopped. The duration of the pre-emission is controlled by the focal length of the taking lens, as will be described later.

In the arrangement according to the second embodiment of the present invention, the incorporated IC 221 constitutes the focal length detection device 103 and the control IC 211 constitutes the emission energy control device 104.

Next, the sequence for the flash exposure by means of the control IC 211 will be explained with reference to a flow chart shown in FIG. 7. For example, when the release button (not shown) is half-depressed, the program shown in FIG. 7 is started. First of all, in a step S1, it is judged whether the main emission of the electronic flash device 230 is required or not, on the basis of the information regarding the brightness of the object and the information regarding the sensitivity of the film, as mentioned above. If it is judged that the main emission is not desired, the normal exposure is effected without using the electronic flash device 230 in a step S20. On the other hand, if it is judged that the main emission should be performed, the sequence goes to a step S2, where the focal length of the taking lens is read in from the incorporated IC 211. Then, in a step S3, the duration of the pre-emission is determined from the focal length of the taking lens. That is to say, the control IC 211 includes a table in which a plurality of values of the focal length correspond to the duration times of the pre-emissions, and the duration of the pre-emission is selected from the table on the basis of the focal length read in the step S2. The duration of the pre-emission written in the table is set to have a value which becomes longer as the focal length increases.

Next, in a step S4, it is judged whether the release button is fully depressed or not. If NO, the sequence waits as it is until the affirmative answer is obtained; whereas, if YES, the sequence goes to a step S5. Hereinafter, the sequence will be explained also with reference to a timing chart shown in FIG. 6C.

In the step S5, the pre-emission start signal is outputted at time $t_1$ to the interface circuit 238 of the electronic flash device 230. Consequently, the Xe tube 236 of the electronic flash device 230 is illuminated in the manner mentioned above, with the result that the emission energy increases as shown in FIG. 6C. Then, the sequence goes to a step S6, where it is judged whether a predetermined time has elapsed or been exhausted from the start of the pre-emission. The predetermined time corresponds to the duration of the pre-emission corresponding to the focal length of the taking lens selected in the step S3. If the negative is given in the step S6, the sequence waits as it is until the affirmative answer is obtained; whereas, if affirmative, the sequence goes to a step S7, where the emission start signal is stopped, thereby stopping the pre-emission (at a time $t_2$ in FIG. 6C).

Next, in a step S8, the control IC 211 judges whether a predetermined time has elapsed or been exhausted from the start of the pre-emission. This predetermined time corresponds to a time required to minimize the pupil diameter of the human eye by means of the pre-emission, and, for example, has a value of 0.75 seconds. If the negative answer is given in the step S8, the sequence waits as it is until the affirmative answer is obtained; whereas, if the affirmative is given, the sequence goes to a step S9, where the flash exposure is effected.

More particularly, an aperture or stop (not shown) is driven and the shutter blades are opened. In response to these operations, the main emission start signal is inputted to the interface circuit 238 of the electronic flash device 230 at a time $t_3$. In this way, the Xe tube 236 of the electronic flash device 230 is illuminated in the same manner as mentioned above, and the emission energy thereof increases as shown in FIG. 6C. Further, in response to the start of the emission of the Xe tube, the adjuster IC 212 is also operated, whereby, when the detection signal sent from the light receiving element 213 reaches a predetermined value determined by the sensitivity of the film, the main emission stop signal is outputted to the interface circuit 238 of the electronic flash device 230 at a time $t_4$. Consequently, the emission of the Xe tube 236 is stopped in the same manner as mentioned above. Thereafter, both of the emission start signal and the emission stop signal are changed to Hi level conditions at a time $t_5$, thus completing the emission sequence. Further, the control IC 211 closes the shutter blades, and then winds up the film and the like, thus finishing the flash exposure.

Normally, in many cases, when the focal length of the taking lens is long, the object distance is also long, and, accordingly, the red-eye effect is apt to occur. Further, when the focal length is long, since the object is sometimes taken in a large scale (with increase magnification), there is a greater problem in that the red-eye effect frequently occurs. According to the above-mentioned sequence, since the duration of the pre-emission for avoiding the red-eye effect becomes long as the focal length of the taking lens is lengthened, even if the object distance is long, the emission energy will not be insufficient, thus avoiding the red-eye effect positively.

Incidentally, in the illustrated second embodiment, while the duration of the pre-emission is lengthened as the focal length of the taking lens becomes long, the present invention is not limited to this; for example, the duration of the emission may be constant and the number of the pre-emission may be increased as the focal length becomes long, thus increasing the total emission energy. Further, the duration of the emission may be constant and the intensity of the pre-emission may be increased as the focal length becomes long, thus increasing the total emission energy. In this case, for example, an emission device having a plurality of emission tubes for avoiding the red-eye effect may be provided independently of the electronic flash device so that the number of the emission tubes to be illuminated is increased as the focal length becomes long, or an emission element for the pre-emission in which the light intensity thereof can be varied in accordance with the voltage applied thereto may be provided so that the applied voltage is increased as the focal length becomes long.

Further, while an example of the electronic flash device having the automatic adjuster system wherein, after the main emission, the brightness of the object is detected and the emission is stopped when the brightness reaches the predetermined value was explained, the present invention is not limited to this example, but may utilize an electronic flash device of another type. In addition, the electronic flash device may be incorporated into the camera or may be removably attached to the camera. Further, while an example in which the electronic flash device is automatically illuminated when the object is dark was explained, the present invention is not limited to this example. For example, a flash device in which the main emission is forcibly performed by a manual operation may be used.

Furthermore, while an example in which the pre-emission for avoiding the red-eye effect is naturally performed prior to the main emission was explained, the pre-emission may be performed prior to the main emission only when it is judged that the red-eye effect will occur, by discriminating the possibility of the red-eye effect on the basis of the brightness of the object. In addition, the present invention may be embodied in a camera of the type in which the pre-emission is performed prior to the main emission when an operator judges the possibility of the red-eye effect and then manipulates the camera in an appropriate manner.

According to the second embodiment of the present invention, since the emission energy for avoiding the red-eye effect is increased as the focal length of the taking lens becomes longer, the following effects or advantages can be obtained. That is to say, when the focal length of the taking lens is long, generally, the object distance is often long, with the result that the red-eye effect is apt to occur. However, according to the second embodiment of the present invention, in such a case, since the emission energy of the pre-emission is increased, the emission energy does not become insufficient, thus avoiding the red-eye effect without fail.

What is claimed is:

1. A flash exposure apparatus comprising:
   a main flash means for emitting first illumination light for illuminating an object;
   an auxiliary flash means for emitting second illumination light toward said object prior to the emission of said first illumination light to decrease the pupil diameter of a human eye in said object;
   a detection means for detecting focal length of a taking lens; and
   a control means for controlling emission energy of said second illumination light so that the emission energy of said second illumination light is increased as the detected focal length becomes longer.

2. A flash exposure apparatus according to claim 1, wherein said control means changes duration of the emission of said second illumination light in response to said detection means to adjust the emission energy.

3. A flash exposure apparatus according to claim 1, wherein said main flash means and said auxiliary flash means form parts of a single flash device, and wherein said main flash means drives said flash device to emit said first illumination light, and said auxiliary flash means drives said flash device to emit said second illumination light.

4. An apparatus for controlling flash light emission of first and second flash devices connected to a camera, comprising:
   means for outputting a first release signal prior to an exposure operation and a second release signal in synchronization with said exposure operation;
   means for detecting completion of preparation of flash light emission of the second flash device; and
   control means for controlling flash light emission of said first and second flash devices based on the state of said second flash device detected by the detecting means, the control means, when the preparation of flash light emission of said second flash device has been completed, causing said first and second flash devices to emit flash light in response to the respective first and second release signals, and when said preparation of flash light emission of the second flash device has not been completed, causing only said first flash device to emit flash light in response to said second release signal.

5. An apparatus according to claim 4, wherein said second flash device has means for accumulating electric charge to be used for flash light emission, and said detecting means detects completion of preparation of flash light emission of said second flash device on the basis of the state of the accumulated charge.

6. An apparatus according to claim 4, wherein said first flash device is built into said camera, and said second flash device is detachably attached to said camera.

7. An apparatus according to claim 4, further comprising, means for increasing the emission energy of flash light emitted by said first flash device as focal length of a taking lens of said camera becomes longer.

8. An apparatus for controlling flash light emission of first and second flash devices connected to a camera, comprising:
   means for outputting a first release signal prior to an exposure operation and a second release signal in synchronization with said exposure operation;

means for detecting completion of preparations of flash light emission of said first and second flash devices;

control means for controlling flash light emissions of said first and second flash devices based on the states of said first and second flash devices detected by the detecting means, the control means, when preparations of flash light emissions of said first and second flash devices have been completed, causing said first and second flash devices to emit flash light in sequence in response to said first and second release signals, respectively, and when preparation of flash light emission of only one of the first and second flash devices has been completed, causing only said one flash device to emit flash light in response to said second release signal.

9. An apparatus according to claim 8, wherein each of said first and second flash devices has means for accumulating electric charge to be used for flash light emission, and said detecting means detects preparations of flash light emissions of said first and second flash devices based on the state of the accumulated charge.

10. An apparatus according to claim 8, wherein said first flash device is built into said camera and said second flash device is detachably attached to said camera.

11. An apparatus according to claim 8, further comprising, means for increasing the emission energy of flash light emitted by said first flash device as focal length of a taking lens of said camera becomes longer.

12. An apparatus for controlling flash light emission of first and second flash devices connected to a camera, comprising:

means for outputting a first release signal prior to an exposure operation and a second release signal in synchronization with said exposure operation;

means for detecting completion of preparation of flash light emission of the second flash device; and control means for controlling flash light emission of said first and second flash devices based on the state of said second flash device detected by the detecting means, the control means, when the preparation of flash light emission of said second flash device has been completed, causing said first and second flash devices to emit flash light in response to the respective first and second release signals, and when said preparation of flash light emission of the first flash device has not been completed, causing only said second flash device to emit flash light in response to said second release signal.

13. An apparatus for controlling flash light emission of a camera in which a first flash device is incorporated and to which a second flash device is removably attached, comprising:

means for outputting a first release signal prior to an exposure operation and a second release signal in synchronization with said exposure operation;

means for detecting attachment of said second flash device to said camera; and control means for controlling flash light emission of said first and second flash devices to cause said first flash device to emit flash light in accordance with said first and second release signals, respectively, when said detecting means detects that said second flash device has not been attached to the camera, and to cause said first and second flash devices to emit flash light, in accordance with said first and second release signals, respectively, when said detecting means detects that said second flash device has been attached to the camera.

* * * * *